No. 793,743.

Patented July 4, 1905.

UNITED STATES PATENT OFFICE.

TRAUGOTT SANDMEYER, OF BASEL, SWITZERLAND, ASSIGNOR TO ANILINE COLOR AND EXTRACT WORKS, FORMERLY JOHN R. GEIGY, OF BASEL, SWITZERLAND.

PROCESS OF MAKING DIAZO COMPOUNDS.

SPECIFICATION forming part of Letters Patent No. 793,743, dated July 4, 1905.

Application filed September 30, 1904. Serial No. 226,619. (Specimens.)

*To all whom it may concern:*

Be it known that I, TRAUGOTT SANDMEYER, of Basel, Switzerland, have invented new and useful Improvements in Processes of Making Diazo Compounds, of which the following is a specification.

This invention is based upon the discovery that sulfo-acids of the 1-amido-2-naphthol can be transformed under certain conditions into the corresponding diazo compounds or sulfo-acids of the naphthalene-1-2-diazo oxid, (Bamberger, *Ber. D. D. Chem. Ges.*, XXVII, 683,) which new diazo compounds are obtained in pure and dry state in the form of free sulfonic acids or their salts. Hitherto by diazotizing the aforesaid sulfonic acids of the 1-amido-2-naphthol in the usual manner—namely, in the presence of free mineral acids—the nitrous acid reacts chiefly as oxidizing agent transforming the amidonapthol sulfonic acids mostly into naphthochinone sulfonic acids. Now I have made the surprising observation that without an addition of a mineral acid, but only by mixture of a 1-amido-2-naphtholmono or polysulfonic acid or its acid salt with a solution of sodium nitrite, an easy and complete diazotation takes place if a proportionally small quantity of a neutral copper salt has been first added to the sulfonic acid or to the sodium nitrite. In a limited measure the same catalytic effects are also shown by other metallic salts, especially iron salts.

The following examples are given to illustrate the method of carrying out the invention:

*Example 1—Production of 1-diazo-2-naphthol-4-sulfonic acid or naphthalene-1-2-diazo-oxid-4-sulfonic acid.*—A thin paste of twelve kilos of 1-amido-2-naphthol-4-sulfonic acid in fifty liters of water cooled with ice is mixed with the cold concentrated solution of one kilo of copper sulfate, after which immediately a concentrated solution of 3.5 kilos of sodium nitrite is slowly added while stirring. Corresponding with the addition of the nitrite the diazotation takes place, and it results finally a clear orange-yellow solution, which is filtered off from any eventually undiazotized particles of the amido acid. After addition of concentrated hydrochloric acid the filtrate changes into a thick paste of the precipitated diazo compound, which is filtered off, washed with diluted hydrochloric acid, pressed, and dried.

1-diazo-2-naphthol-4-sulfonic acid forms a grey-yellowish crystalline powder, soluble with a pale yellow color in pure water, from which solution however it is for the greatest part precipitated in the form of yellowish fine needles upon addition of hydrochloric acid. With resorcin in alkaline solution it combines immediately to a black-violet dyestuff.

*Example 2—Production of 1-diazo-2-naphthol-6-sulfonic acid or naphthalene-1-2-diazo-oxid-6-sulfonic acid.*—Twelve kilos of 1-amido-2-naphthol-6-sulfonic acid in one hundred liters of water mixed with a solution of eight hundred grams of copper chlorid are diazotized while cooled with ice by gradual addition of 3.5 kilos of sodium nitrite. The filtered diazo solution is slightly acidulated with pure hydrochloric acid, then mixed with a solution of barium chlorid, after which the barium salt of the 1-diazo-2-naphthol-6-sulfonic acid separates as a heavy golden-yellow precipitate, which is filtered off, washed, and dried.

*Example 3—Production of 1-diazo-2-naphthol-3-6-disulfonic acid or naphthalene-1-2-diazo-oxid-3-6-disulfonic acid.*—Seventeen kilos of the acid sodium salt of the 1-amido-2-naphthol-3-6-disulfonic acid in one hundred liters of water are diazotized after addition of one kilo of copper sulfate in the above-described manner. The acid sodium salt of the 1-diazo-2-naphthol-3-6-disulfonic acid is separated from the acidulated yellow solution by means of common salt in the form of an amorphous yellow precipitate.

Having now described my invention, what I claim is—

The herein-described process for the production of sulfonic acids of the naphthalene-1-2-diazo oxid, which consists in diazotizing the sulfonic acids of the 1-amido-2-naphthol with sodium nitrite in the presence of a neutral copper salt, substantially as set forth.

In testimony whereof I have signed my name to this specification in the presence of two subscribing witnesses.

TRAUGOTT SANDMEYER.

Witnesses:
ALBERT GWIETER,
GEO. GIFFORD.